United States Patent [19]

Wescott

[11] Patent Number: 4,470,257
[45] Date of Patent: Sep. 11, 1984

[54] ISOCHRONOUS AND DROOP SPEED CONTROL FOR A COMBUSTION TURBINE

[75] Inventor: Kermit R. Wescott, Kennett Square, Pa.

[73] Assignee: Westinghouse Electric Corp., Pittsburgh, Pa.

[21] Appl. No.: 373,545

[22] Filed: Apr. 30, 1982

[51] Int. Cl.³ ............................................. F02C 9/28
[52] U.S. Cl. ................................................ 60/39.281
[58] Field of Search .............. 60/39.281; 290/40 A, 290/40 C

[56] References Cited

U.S. PATENT DOCUMENTS

| | | | |
|---|---|---|---|
| 2,671,860 | 3/1954 | Bevins | 290/40 C |
| 3,520,133 | 7/1970 | Loft et al. | 60/39.281 |
| 3,620,010 | 11/1971 | Davis | 60/39.281 |
| 3,790,765 | 2/1974 | Morrison | 235/150.1 |
| 3,925,645 | 12/1975 | Stern | 235/151.21 |
| 3,973,391 | 8/1976 | Reed et al. | 60/39.29 |
| 4,009,567 | 3/1977 | Burrows | 60/39.03 |
| 4,040,250 | 8/1977 | Saunders et al. | 60/39.281 |
| 4,185,203 | 1/1980 | Takeuchi | 290/40 C |
| 4,205,380 | 5/1980 | Braytenbah | 364/494 |

Primary Examiner—Louis J. Casaregola
Attorney, Agent, or Firm—E. F. Possessky

[57] ABSTRACT

A speed and load control for a combustion turbine utilized in the generation of electric power includes means for effecting a smooth transition between the isochronous and droop modes of control. The speed and load control also includes means for maintaining a constant power level during a transition from the isochronous to the droop mode of control so as to minimize fluctuations in signal frequency.

3 Claims, 2 Drawing Figures

ISOCHRONOUS AND DROOP SPEED CONTROL FOR A COMBUSTION TURBINE

BACKGROUND OF THE INVENTION

The present invention relates generally to a speed-load control for a combustion turbine and more particularly to a controller having the ability to transfer between droop and isochronous modes of control with minimal effect on load balance and frequency.

Two fundamental modes for controlling the speed-load characteristics of a combustion turbine are isochronous control and droop control. A controller operating in the isochronous mode maintains the turbine at a constant speed without regard to turbine load. A controller operating in the droop mode controls turbine speed as a function of turbine load.

A typical power generation system for supplying power to a single power generation grid may include turbines having both droop and isochronous controllers. Such a system typically comprises a main generating unit operating in the isochronous mode to maintain the output electric power at a constant frequency and one or more booster generating units operated in the droop mode. In this arrangement the droop controlled units are adjusted to share the load with the main generating unit so as to assure that the isochronous controller is able to maintain a constant speed. The booster generating units are locked in step with the main generating unit, as if mechanically coupled thereto, so that the speed of the booster generating units is fixed by the constant speed of the main generating unit.

The load level on the booster generating units may be controlled by regulating the fuel supply to the turbine driving the units. Generally, increasing the fuel flow to a turbine operating in the droop mode of control increases the load shared by that generating unit. Assume, for example, that a given power generation grid is serviced by a main generating unit and a single booster generating unit operating in parallel. The main generating unit is controlled isochronously while the booster generating unit is controlled in the droop mode. Assume also that the generating units are in a steady-state condition, sharing the load equally.

An increase in fuel flow to the booster generating unit would tend to increase its speed, but because the booster unit is locked in step with the main unit, it cannot increase speed. Consequently, the booster unit now accepts additional load. If the load level of the given power generation grid remains constant, the additional load accepted by the booster unit must be withdrawn from the main unit, which thereafter would tend to increase speed.

The isochronous controller on the main unit, however, compensates for the load loss by decreasing fuel flow so as to maintain a constant speed. Hence, the increased fuel flow to the booster unit caused a transfer of load from the main unit to the booster unit and a reduction in fuel flow to the main unit.

The need sometimes arises in the operation of such power generation systems to change a generating unit's mode of control from droop to isochronous or from isochronous to droop. This might occur, for example, where a main unit must be shut down for maintenance or inspection or where a booster unit must be operated as a main unit to supply power to an isolated portion of the grid. In such cases it is desirable to have a method of changing from droop to isochronous control or from isochronous to droop control which effects minimal disturbance in the output of the power generation system.

U.S. Pat. No. 3,620,010 describes a system for switching the control of the generating unit between the droop mode and the isochronous mode. Although the system described in the named patent is effective to switch between the two control modes, it does little to minimize disturbance to the power output signal and requires extensive operator interaction to effect a successful change.

Consider, for example, a change from the isochronous mode to the droop mode of control. A typical isochronous controller comprises a proportional and integral controller having a speed feedback loop. The change from isochronous to droop requires that a power (or load) feedback signal be algebraically summed with a speed reference signal of the isochronous controller. This constitutes the fundamental structural distinction between the two modes of control. The system in the named patent effects this change by closing a switch, which introduces the power feedback signal to a summing junction. System transients are minimized by pre-adjusting the level of the power feedback signal to prevent an immediate load shift to a parallel generating unit coupled thereto. Load shifts are thereafter accomplished by operator adjustment of feedback signal levels. No attempt is made to minimize the effect of control mode change upon the power level and frequency of the entire power generation system.

Hence, it appears that the known prior art fails to address the problem of providing a wholly automatic system for switching between droop control and isochronous control of a power generating unit while maintaining a substantially constant power output level and power output frequency.

SUMMARY OF THE INVENTION

Accordingly, a control system operates a combustion turbine utilized in the generation of electric power with improved transition between an isochronous mode of control and a droop mode of control in accordance with the invention. More particularly, the system includes a proportional and integral controller which is provided with a plurality of input signals for selectively enabling the controller to operate in either the isochronous or the droop mode of control. The transition between the isochronous and droop modes of control is effected by gradually increasing or decreasing the magnitude of one of the input signals to the controller. The gradual transition from one mode of control to the other prevents the generation of undesirable transients which might occur if the input signal were switched in or out as a step function. To minimize disturbances in the electric power generated by use of the rotational motion produced by the combustion turbine, means are included for controlling the power level and the frequency of the generated electric power during the transition from the speed mode of control to the load mode of control.

DESCRIPTION OF THE PREFERRED EMBODIMENT

Figure 1:
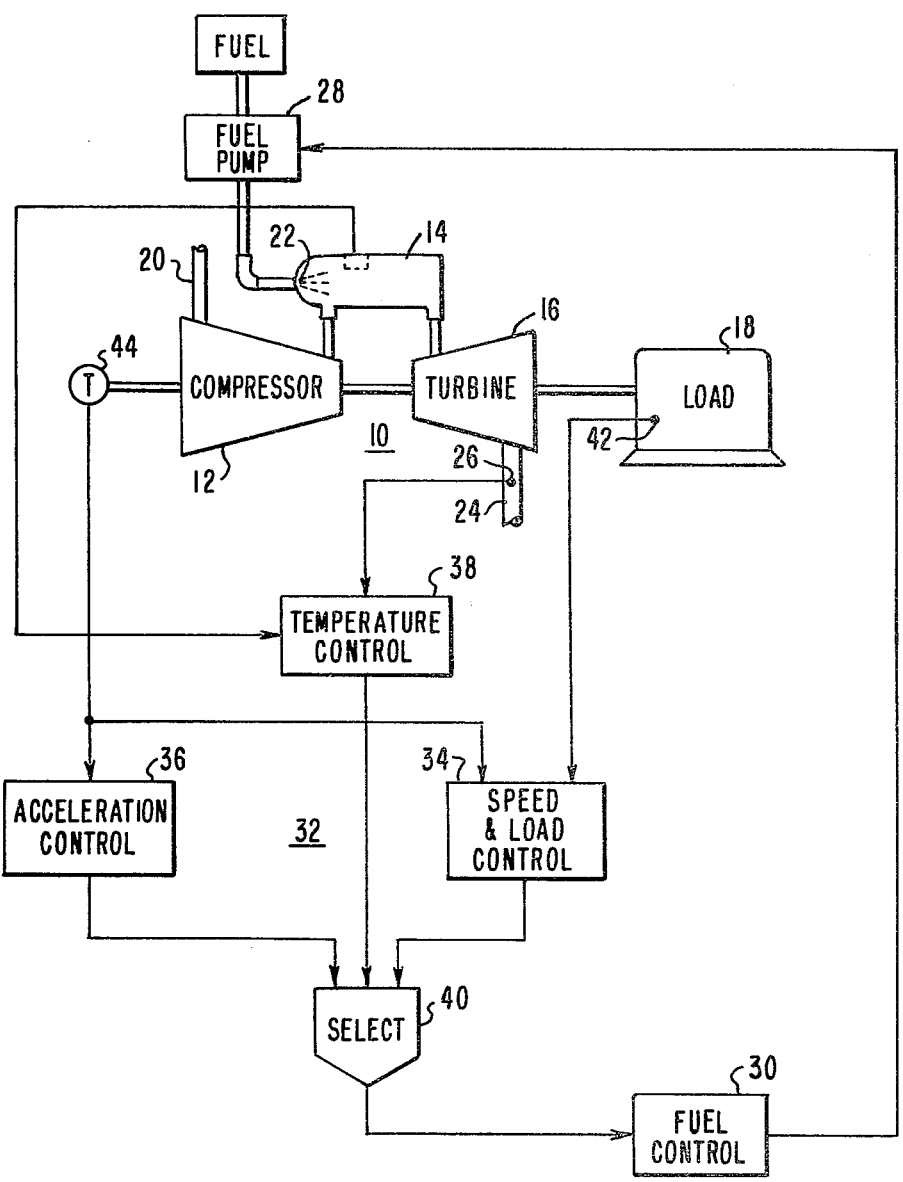
FIG. 1 shows a general block diagram of a control system for a combustion turbine.

Referring to FIG. 1, a simplified representation of a single-shaft turbine 10 includes a compressor 12, a combustor basket 14, and a turbine 16 connected to drive a load 18. Air entering a compressor inlet 20 supports the combustion of fuel injected by a nozzle 22. Heated exhaust gases exit from a turbine outlet 24 past distributed thermocouples 26. A fuel pump 28 delivers fuel to the nozzle 22 according to a rate set by a fuel control 30. The details of the fuel control 30 are not material to the present invention since it may include any servo control which produces an output according to an electrical input signal, there being many devices on the market suitable for such use.

A typical control system for a combustion turbine comprises three major subsystems: a speed and load control 34, an acceleration control 36, and a temperature control 38. The three subsystems receive input signals from transducers positioned appropriately throughout the turbine system. These are depicted generally in FIG. 1. The interconnections between the turbine control subsystems and an operator's panel are not depicted in FIG. 1. Each of the subsystems 34, 36, 38 produces an output signal which is applied to a signal select gate 40, such as that described in U.S. Pat. No. 3,520,133, which is hereby incorporated by reference. In the above-named patent, the signal select gate comprises a low value gate which selects the lowest of the analog signals applied to the gate to provide as an input to a fuel control.

Figure 2:
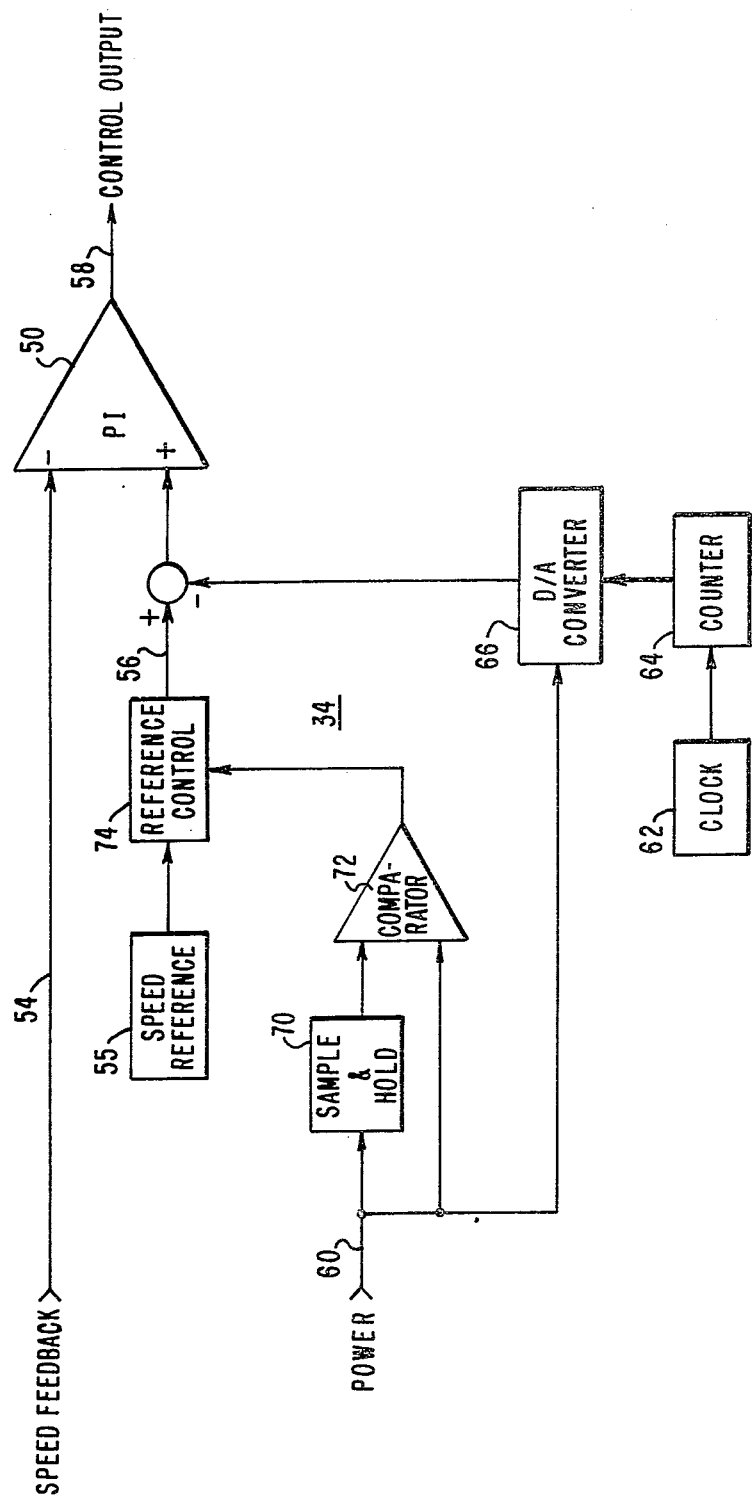
FIG. 2 shows a general block diagram of the speed and load control, structured according to the principles of the invention.

The speed and load control 34 receives signals from plate megawatt meters 42 indicating the electrical loading factor for the turbine and signals from a tachometer 44 indicating the rotational velocity of the turbine. A speed and load control structured according to the principles of the invention is shown in greater detail in FIG. 2.

The speed and load control 34 includes a proportional and integral controller 50 of a type well known in the art. When the speed and load control 34 operates in the isochronous mode, a single speed feedback loop is operative around the controller 50. The tachometer 44 (FIG. 1) provides a feedback signal 54 indicative of actual turbine speed. The speed feedback signal 54 is compared at the controller 50 with a speed reference signal 56. The source of the speed reference signal 56 is shown generally at 55, which may be an operator-adjusted analog signal, an automatically adjusted signal, such as by a microcomputer, or a combination of both. The controller 50 adjusts its output 58, connected to the fuel control 30 (FIG. 1), to alter the fuel flow until the speed feedback signal 54 matches the speed reference signal 56.

When the speed and load control 34 is operated in the droop mode, in addition to the speed feedback loop, a power feedback signal 60 is algebraically added to the speed reference signal 56. In the droop mode of control the controller 50 adjusts its output 58 until the combination of the speed reference signal 56 and the power feedback signal 60 matches the speed feedback signal 54.

In accordance with the principles of the invention, the speed and load control 34 is structured to automatically switch between the droop and isochronous modes of control with minimal effect on output power level and frequency. A timer device or clock 62 provides a clocking signal to a binary up/down counter 64. The output of the counter is connected to a multiplying digital-to-analog converter 66. The power feedback signal 60 is applied to a reference voltage input on the digital-to-analog converter 66. When the output of the counter 64 is all zeros, the output of the digital-to-analog converter 66 is zero volts. When the output of the counter 64 is all ones (full scale), the output of the digital-to-analog converter 66 equals the level of the power feedback signal 60. At any given time the ratio of the output level of the digital-to-analog converter 66 to the power feedback signal 60 equals the ratio of the output value of the counter 64 to the full-scale value of the counter.

Using the combination of the clock 62, the counter 64, and the digital-to-analog converter 66, the power feedback signal may be gradually introduced to or removed from the controller 50 so as gradually to switch the speed and load control 34 between the droop and isochronous modes of control.

Assume, for example, that the controller 50 is operating in the droop mode of control. The output of the counter 64 is at full scale so that the digital-to-analog converter 66 acts like a closed switch, its output equal to the level of the power feedback signal 60. If the counter is clocked down from full scale to zero at a predetermined rate, the level of the power feedback signal 60 applied to the controller 50 is gradually diminished. When the output of the counter 64 reaches zero, the power feedback loop is open and the controller 50 is operating in the isochronous mode.

The controller 50 may be returned to the droop mode of control by reversing the process. As the counter 64 is clocked from zero to full scale, the power feedback signal 60 is gradually introduced to the controller 50, resulting in a change from the isochronous mode to the droop mode of control.

A typical power generation unit may comprise a main generating unit operating in the isochronous mode and one or more booster generating units operating in the droop mode.

In the course of switching a booster generating unit to the status of a main generating unit (changing one machine from droop control to isochronous control while simultaneously changing another machine from isochronous control to droop control), it is desirable to minimize the effect of this switching operation on the power output level and frequency.

Accordingly, the speed and load control 34 is structured to achieve this goal. The speed and load control 34 is provided with devices which are active during the transition from isochronous control to droop control. In the short term, most electrical systems will maintain a constant frequency if power levels are maintained. Hence, the speed and load control 34 includes a sample-and-hold device 70 and a comparator 72 which operate cooperatively to adjust the level of the speed reference signal 56 to maintain a constant output power while the power feedback signal is gradually introduced to the controller 50. At the instant a transition from isochronous to droop mode is initiated, the sample-and-hold device 70 records the level of the power feedback signal 60. The sampled signal and the power feedback signal are then continuously compared by the comparator 72, which is connected to a reference control device 74. The level of the speed reference signal 56 is increased or decreased by the reference control device 74 as necessary to maintain a constant power output level on the turbine. This will, in turn, minimize fluctuations in signal frequency during the transition period. At the conclusion of the transition a booster generating unit that was formerly operating in the droop mode will then be operating in the isochronous mode, assuring a constant frequency.

Hence, the present invention provides means for gradually switching a combustion turbine speed and load control between the isochronous and droop modes of control. Ramping the power feedback signal 60 into and out of the controller 50 avoids system transients which would result from a step function change from one control mode to the other. The provision of the present invention for adjusting the level of the speed reference signal so as to maintain a constant power level during the transition serves to minimize fluctuations in signal frequency, thereby diminishing disturbances to the power generation grid. In addition, the present invention operates automatically to achieve these characteristics, avoiding the variability inherent in operator discretion.

What is claimed is:

1. A control system for a combustion turbine operable in the generation of electric power at a certain frequency and power level, said control system comprising:
    an acceleration control for limiting the rate of change of turbine rotational velocity during start-up or sudden loss of load;
    a temperature control for limiting the temperature of driving gases and turbine components; and
    a speed and load control for limiting turbine rotational velocity and electrical loading, said speed and load control comprising:
    a proportional and integral controller providing an output signal from said speed and load control;
    means for providing a speed reference and speed and power feedback signals to said controller;
    means for summing said speed reference and feedback signals in an isochronous mode of control;
    means for summing said power feedback signal with said speed signals in a droop mode of control;
    means for ramping one of said input signals into or out of said controller to effect a transition between the isochronous and droop modes of control or vice versa; and
    means are provided for generating and for adjusting offset to said speed reference signal to hold the generated power level substantially constant during a transition from the isochronous mode of control to the droop mode of control.

2. A control system according to claim 1 wherein said ramping means comprises:
    a summing junction for summing said speed reference signal and said power feedback signal and for providing the sum thereof as an input to said controller;
    a multiplying digital-to-analog converter connected to supply said power feedback signal to said summing junction for ramping the magnitude of said power feedback signal into and out of said summing junction;
    a counter connected to said converter for counting between zero and a full-scale output; and
    a clock connected to said counter for clocking said counter, whereby the ratio of the magnitude of said power feedback signal at said summing junction to the magnitude of said power feedback signal at said converter is equal to the ratio of the present state of said counter to the full-scale state of said counter, the presence of said power feedback signal giving rise to the droop mode of control and the absence of said power feedback signal giving rise to the isochronous mode of control.

3. A control system according to claim 2 wherein said offset generating means comprises:
    means for sampling and storing the magnitude of said power feedback signal upon initialization of the transition from the isochronous to the droop mode of control;
    means connected to said sample-and-store means and said power feedback signal for comparing the sampled magnitude to the present magnitude of said power feedback signal and for providing an output signal indicative thereof; and
    means responsive to the output of said comparing means for adjusting the magnitude of said speed reference signal to maintain a constant power level in the generated electric power.

* * * * *